March 22, 1938.  O. C. RITZ-WOLLER  2,111,641
TRUCK MIRROR AND THE LIKE
Filed Feb. 23, 1937
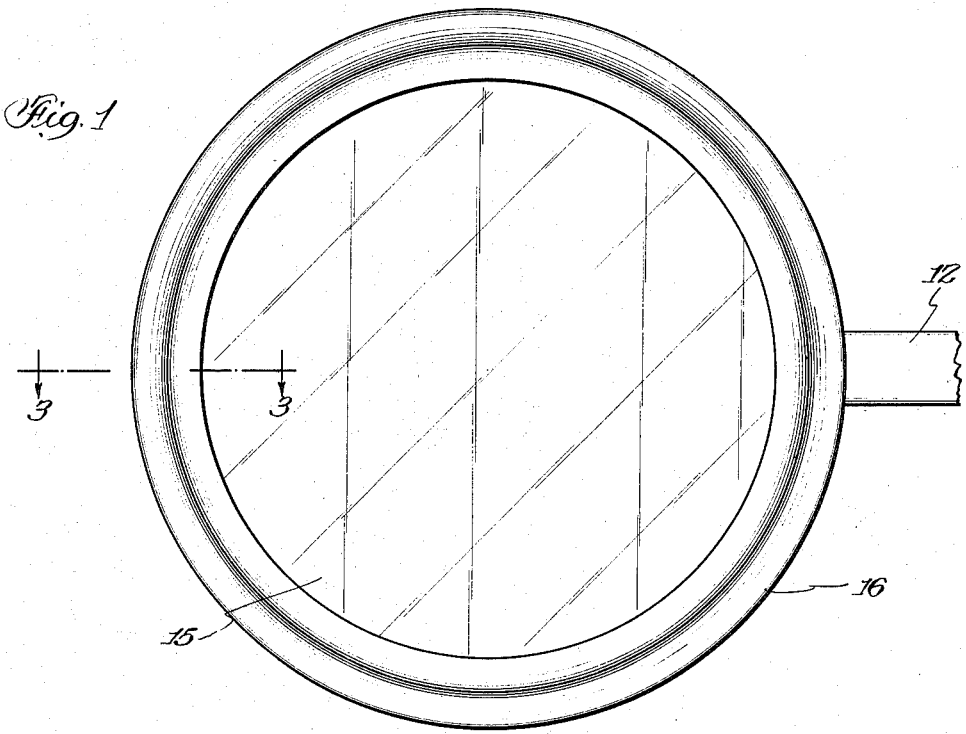
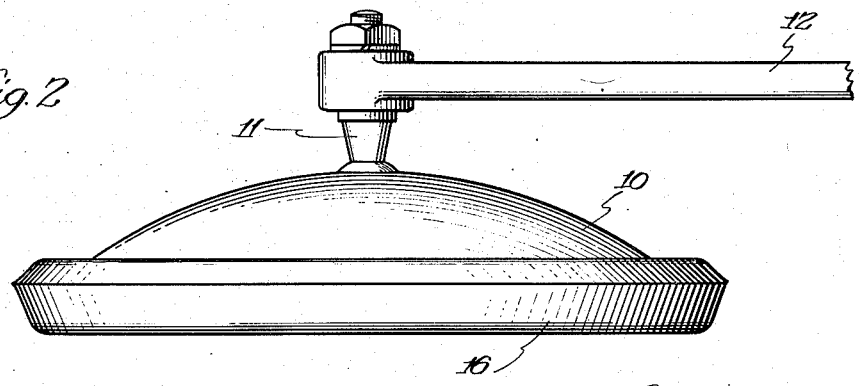
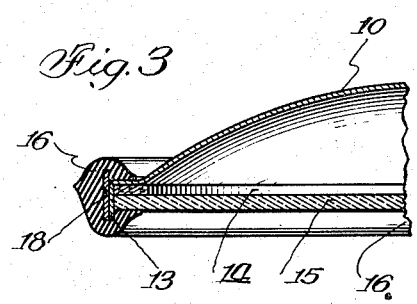
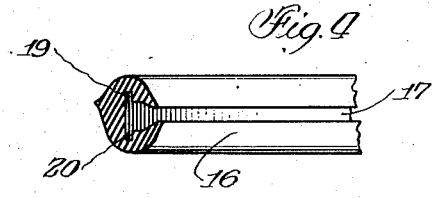
Inventor:
Oliver C. Ritz-Woller,
By: Fricke & DeBusk,
Atty's

Patented Mar. 22, 1938

2,111,641

UNITED STATES PATENT OFFICE 2,111,641

TRUCK MIRROR AND THE LIKE

Oliver C. Ritz-Woller, Chicago, Ill.

Application February 23, 1937, Serial No. 126,957

2 Claims. (Cl. 88—96)

My invention relates to truck mirrors and the like and has for its object the provision of a new and improved form and arrangement of parts by which two members having their outer edges oppositely disposed may be secured together so as to be held firmly in normal position with respect to each other and by which the members may be protected from damage by a blow or by pressure otherwise thereon. Specifically it is my object to provide an improved arrangement comprising a mirror and a sheet metal casing member therefor, together with an improved form of resilient band and cooperating means by which the parts may be held securely together while at the same time being releasable by the application of a moderate force thereto at the proper angle for effecting disconnection of the parts.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a front face view of my improved device;

Fig. 2 is a top plan view of the device shown in Fig. 1;

Fig. 3 is a horizontal vertical section through a portion of my improved device taken substantially at line 3—3 of Fig. 1; and Fig. 4 is a view of a portion of the resilient band as shown in Fig. 3 but with the associated parts removed.

Referring now to the several figures of the drawing, in which corresponding parts are indicated by the same reference characters, 10 indicates a casing member made of sheet metal pressed into the form of a dish, being provided with a mounting pin 11 thereon at the rear which in the arrangement shown is supported by an arm 12 which in turn is to be secured in any suitable manner to the framework of a truck or other part. As is clearly shown in Fig. 3, the outer edge portion of the casing member 10 is pressed into the form of a cylindrical ring 13 which receives within it a cork gasket 14 and a mirror 15.

For holding the casing member and the mirror in fixed position with respect to each other, with their outer edge portions oppositely disposed, I have provided a resilient band 16 which is preferably made of rubber so as to be capable of being stretched slightly for mounting it about the members 10 and 15. As is best shown in Fig. 4, the band 16 is provided with a groove 17 at its inner face within which the outer edge portions of the casing member and the mirror are adapted to be positioned. For holding the band 16 firmly in position, I have provided a ring 18 formed of sheet metal and extending at its ends beyond the adjacent outer face portions of the casing member 10 and the mirror 15, the opposite end portions of such ring fitting snugly within groove portions 19 and 20 of the resilient band 16, as is best shown in Fig. 4. The arrangement is such that the resilient band 16 holds the mirror 15 firmly in position within the casing member 10 by direct pressure upon such parts, the band 16 itself being held against shifting from its operative position as shown in Fig. 3 by the engagement of the oppositely directed end portions of the ring 18 within the groove portions 19 and 20. By this arrangement the resilient band 16 is held very firmly against shifting transversely of itself so that there is no danger of the band being dislodged from operative position by reason of any blow on the band or by reason of any pressure likely to be brought to bear thereon under ordinary conditions of use of the mirror upon a truck. At the same time, when a moderate pressure is brought to bear upon the resilient band manually at an effective angle with respect to the grip of the band upon the parts, the band can be very easily and quickly removed if desired.

While I prefer to employ the form of device as shown in my drawing, with the ring 18 formed separately from the casing member 10 and rigidly secured thereto by welding or otherwise, it is to be understood that my invention is not limited to such detailed arrangement, since it is evident that parts might well be provided otherwise providing in effect ring portions extending in opposite directions beyond the adjacent outer face portions of the members 10 and 15. My invention is, therefore, not to be limited to the form of arrangement as shown except so far as the narrower claims may be limited to such arrangement.

I claim:—

1. In a device of the class described, the combination of a backing member, a mirror member positioned across said backing member, ring means extending around the marginal portions of said members and attached to one of the members, said ring means having a portion projecting backwardly beyond the marginal portion of the backing member, said ring means having a portion projecting forwardly beyond the marginal portion of the mirror member, and a band of rubber-like material having a groove in its inner face shaped to have snug gripping engagement with said oppositely projecting ring portions so as to hold the band securely in position to grip and hold the parts together in unit form.

2. In a device of the type described, the combination of a dished member of sheet metal having a flange in substantially cylindrical form about its edge, a mirror positioned across said dished member within said flange, a sheet metal ring about said flange extending in both directions beyond the adjacent face portions of the dished member and the mirror, and a band of rubber-like material having a groove in its inner face shaped to have snug gripping engagement with the opposite end portions of said ring so as to hold the band strongly in position to grip and hold the parts together in unit form.

OLIVER C. RITZ-WOLLER.